(12) United States Patent
Dai et al.

(10) Patent No.: US 10,948,048 B2
(45) Date of Patent: Mar. 16, 2021

(54) THICKNESS-VARIABLE TRANSMISSION STRUCTURE FOR ROBOT JOINT

(71) Applicant: BEVELOID ROBOT JOINT TECHNOLOGY (SHANGHAI) CO., LTD., Shanghai (CN)

(72) Inventors: Fei Dai, Shanghai (CN); Jian Sun, Shanghai (CN)

(73) Assignee: BEVELOID ROBOT JOINT TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/481,045

(22) PCT Filed: Dec. 26, 2017

(86) PCT No.: PCT/CN2017/118629
§ 371 (c)(1),
(2) Date: Jul. 25, 2019

(87) PCT Pub. No.: WO2019/114033
PCT Pub. Date: Jun. 20, 2019

(65) Prior Publication Data
US 2019/0390736 A1    Dec. 26, 2019

(30) Foreign Application Priority Data

Dec. 15, 2017 (CN) .......................... 201711345583.1

(51) Int. Cl.
*F16H 1/28* (2006.01)
*F16H 55/08* (2006.01)
*F16H 55/17* (2006.01)
*F16H 57/08* (2006.01)

(52) U.S. Cl.
CPC .......... *F16H 1/28* (2013.01); *F16H 55/0886* (2013.01); *F16H 1/2863* (2013.01); *F16H 55/17* (2013.01); *F16H 57/082* (2013.01); *F16H 2001/2881* (2013.01)

(58) Field of Classification Search
CPC .................... F16H 2001/2881; F16H 57/0886
See application file for complete search history.

(56) References Cited

U.S. PATENT DOCUMENTS 3,485,450 A * 12/1969 Batt .................. F02K 1/004
                                            239/265.35
5,910,066 A *  6/1999 Schulz ............... F16H 1/2863
                                            475/331

FOREIGN PATENT DOCUMENTS

JP          7-332448     * 12/1995

* cited by examiner

*Primary Examiner* — Erin D Bishop
(74) *Attorney, Agent, or Firm* — CBM Patent Consulting, LLC

(57) ABSTRACT

A thickened robot joint transmission structure comprises a shell, dual gear rings and a planet carrier, wherein the planet carrier is fixed to the shell through a crossed roller bearing. Planet gears are dual thickened planet gears free of a sun gear. The input ends are a pair of gears or spiral bevel gears with a variable velocity ratio and are fixed to the shell through deep groove ball bearings. The dual thickened planet gears serve as a hollow for a cable, a related shaft or a line object to pass through after the sun gear is removed.

5 Claims, 2 Drawing Sheets

US 10,948,048 B2

THICKNESS-VARIABLE TRANSMISSION STRUCTURE FOR ROBOT JOINT

TECHNICAL FIELD

The utility model relates to the field of slowdown of joints, in particular to a thickened robot joint transmission structure.

BACKGROUND

A sun gear is generally adopted in the prior art for driving. In addition, the existing reducer mainly includes a cycloidal pin gearbox, a common planetary gearbox, a worm gearbox and a harmonic gearbox. The common single-stage and two-stage planetary gearboxes have a small reduction ratio range, the worm gearbox has a relatively large reduction ratio range, but both of them are low in input speed and limited in application range. At present, the most important application is that the cycloidal pin gear reducer is driven by a crankshaft, with high transmission precision, complicated mechanism and extremely high requirements on processing technology. The harmonic reduction gearbox is in surface contact multi-tooth meshing and has a compact structure, but takes an elastic chip cup ring as an output. The meshing position and the output portion must be elastically deformed, accompanied with poor structural impact resistance. Therefore, with the development and application of new technologies, the requirements on gearboxes and joints continue to increase.

SUMMARY

An objective of the utility model aims to solve the above problems. A planetary carrier is adopted in the utility model for driving. The utility model provides a thickened robot joint transmission structure which has a compact and reasonable structure, high power density, high rigidity and low backhaul errors. There must be two degrees of freedom for dual gear rings, so there are two output speeds, and therefore, if the speed of one gear ring is set to zero, the speed is output by the other gear ring. This structure has a large reduction ratio range and is easy to implement a modular design.

To fulfil said objective, a thickened robot joint transmission structure is designed, in which dual thickened planetary gear rings are driven by dual thickened planetary gears. The thickened robot joint transmission structure comprises a first stage transmission chain, a planetary carrier, a planetary pin, dual thickened planetary gears, a first thickened gear ring, a second thickened gear ring, a shell assembly and an output shaft, wherein the transmission structure is of a sun-gear-free transmission structure; the first stage transmission chain serves as an input end; the first thickened gear ring is connected to an output shaft and serves as an output end; a gear in the first stage transmission chain is meshed with the planetary carrier; the planetary pin is arranged on the planetary carrier; the planetary carrier and the planetary pin are connected with the dual thickened planetary gears; the planetary carrier drives the planetary pin to rotate along the center, and simultaneously drives the dual thickened planetary gears to rotate and revolve; the dual thickened planetary gears are meshed with the first thickened gear ring and the second thickened gear ring respectively; the second thickened gear ring is fixed on the shell assembly; the first thickened gear ring is connected to the output shaft in an interference manner or through a fixing pin or a bolt.

The thickened robot joint transmission structure is arranged in a center array.

The dual thickened planetary gears, the planetary carrier, the planetary pin, the first thickened gear ring and a second thickened gear ring form a planetary system assembly; the dual thickened planetary gears are arranged in a central symmetrical manner, or are arranged in a non-central equiangular shape to satisfy the planetary transmission law.

The first thickened gear ring is connected to the output shaft to form an output structure, and is fixed to the shell through a high-strength crossed cylindrical roller bearing.

The dual thickened planetary gears have a thickness continuously changing in a tooth direction and have continuously changed helix angles and pressure angles.

The planetary pin in the planetary carrier and the transmission center can be in a parallel or angular relationship.

The first thickened gear ring and the planetary carrier form a fixed combination structure and are relatively rotatable by a bearing and the planetary carrier.

The dual thickened planetary gears are of a sun-gear-free structure and serves as a hollow shaft for a cable, a related shaft or a line object to pass through after the sun gear is removed.

The planetary carrier is fixed to the shell through the crossed roller bearing; the crossed roller bearing is of a sealed structure; the left side and the right side of the crossed roller bearing may be separated by grease or fat.

The gear ratio of the first stage transmission chain is i1; the numbers of teeth of the first thickened gear ring and the second thickened gar ring are z2 and z4 respectively; the number of teeth of the dual thickened planetary gears is z1 and z3 respectively, and then the total gear ratio is $i1*z1*z4/(z1*z4-z2*z3)$.

The second thickened gear ring is fixed to the shell assembly, and the rotation velocity of zero; the linkage of the dual thickened planetary gears is zero relative to the rotation velocity; the backlash of the thickened gear rings can be controlled by a splined, non-circular structure relative to the axial movement.

Compared with the prior art, the utility model has the following advantages: a sun gear is generally adopted in the prior art for driving, while the planetary carrier is adopted in the utility model for driving; there must be two degrees of freedom for dual gear rings, so there are two output speeds, and therefore, if the speed of one gear ring is set to zero, the speed is output by the other gear ring. The planetary drive in series is used to obtain a desired module design reduction ratio. By changing the gear ratio through the first stage transmission to meet the different gear ratio requirements of the same model, the planetary transmission can obtain a higher power density. Thickened gears can achieve smaller backhaul errors and meet the requirements of no backlash, and can further achieve a greater output torque in a limited space. Compared with roller cycloid and harmonic drive, the thickened gears have more balanced and stable transmission, higher motion transmission accuracy, more reliable process, and excellent gear surface heat treatment process and provide stable and reliable life.

In drawings, reference symbols represent the following components: 1—shell assembly; 2—first thickened gear ring; 3—dual thickened planetary gears; 4—second thickened gear ring; 5—first stage transmission chain; 6—driving mechanism; 7—output shaft; 8—planetary carrier; 9—planetary pin; 10—bearing.

DETAILED DESCRIPTION

The utility model will be further described below, and it should be understood that the specific embodiments described herein are merely illustrative of the utility model and are not intended to limit the utility model.

Figure 1:
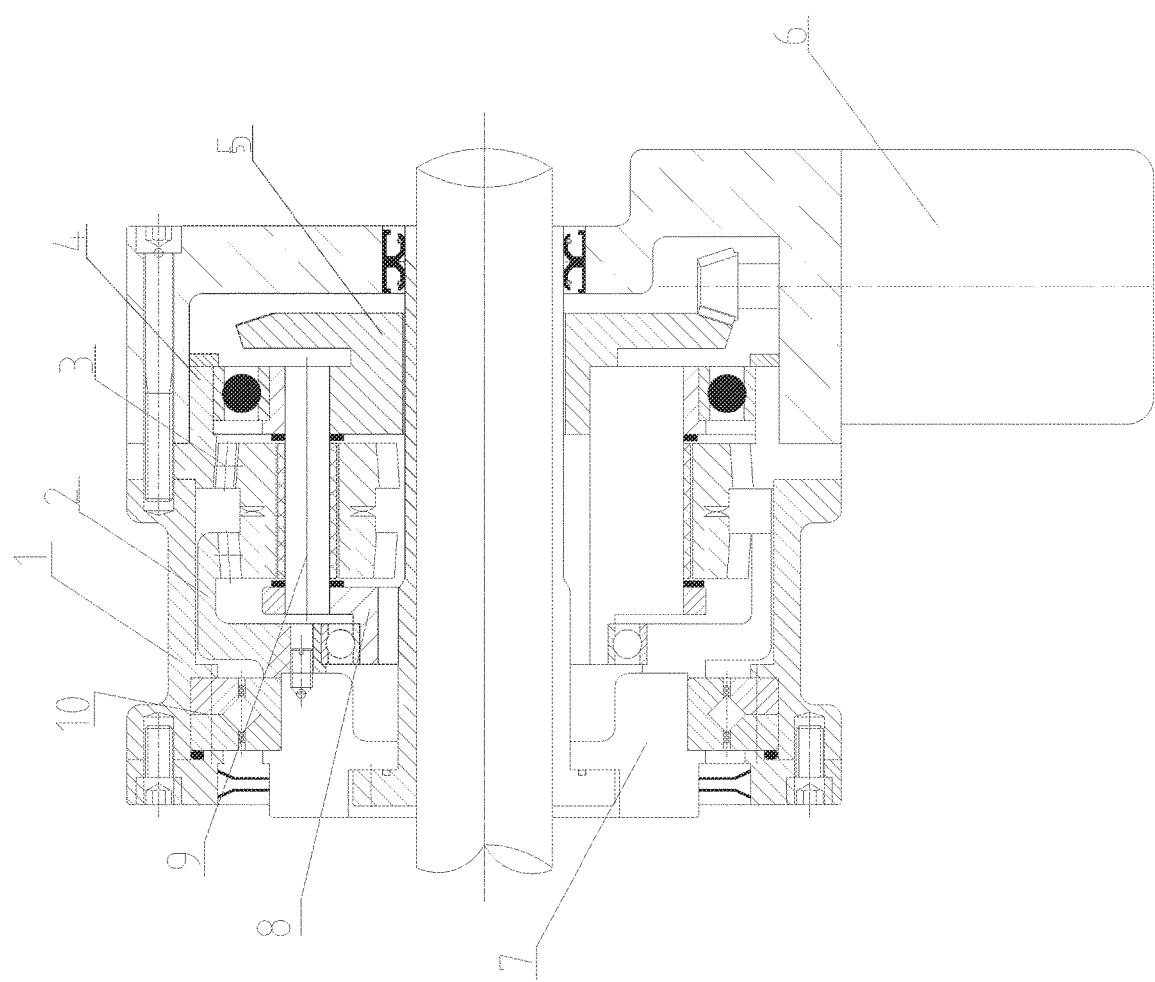
FIG. 1 is a structural schematic diagram of a thickened robot joint transmission structure of the utility model.

Referring to FIG. 1, a thickened robot joint transmission gearbox of the utility model comprises a first stage transmission chain box shell assembly 1, a first thickened gear ring 2, a second thickened gear ring 4, dual thickened planetary gears 3, a first stage transmission chain 5, a driving mechanism 6, an output shaft 7, a planetary carrier 8, a planetary pin 9 and a bearing 10.

Referring to FIG. 1, the first stage transmission chain 5 serves as an input end. The first thickened gear ring 2 is connected to an output shaft 7 and serves as an output end. A gear in the first stage transmission chain 5 is meshed with the planetary carrier 8. The planetary pin 9 is arranged on the planetary carrier 8. The planetary carrier 8 and the planetary pin 9 are connected with the dual thickened planetary gears 3. The planetary carrier 8 drives the planetary pin 9 to rotate along the center, and simultaneously drives the dual thickened planetary gears 3 to rotate and revolve. The dual thickened planetary gears 3 are meshed with the first thickened gear ring 2 and the second thickened gear ring 4 respectively. The second thickened gear ring 4 is fixed on the shell assembly 1. The first thickened gear ring 2 is connected to the output shaft 7 in an interference manner or through a fixing pin or a bolt.

Figure 2:
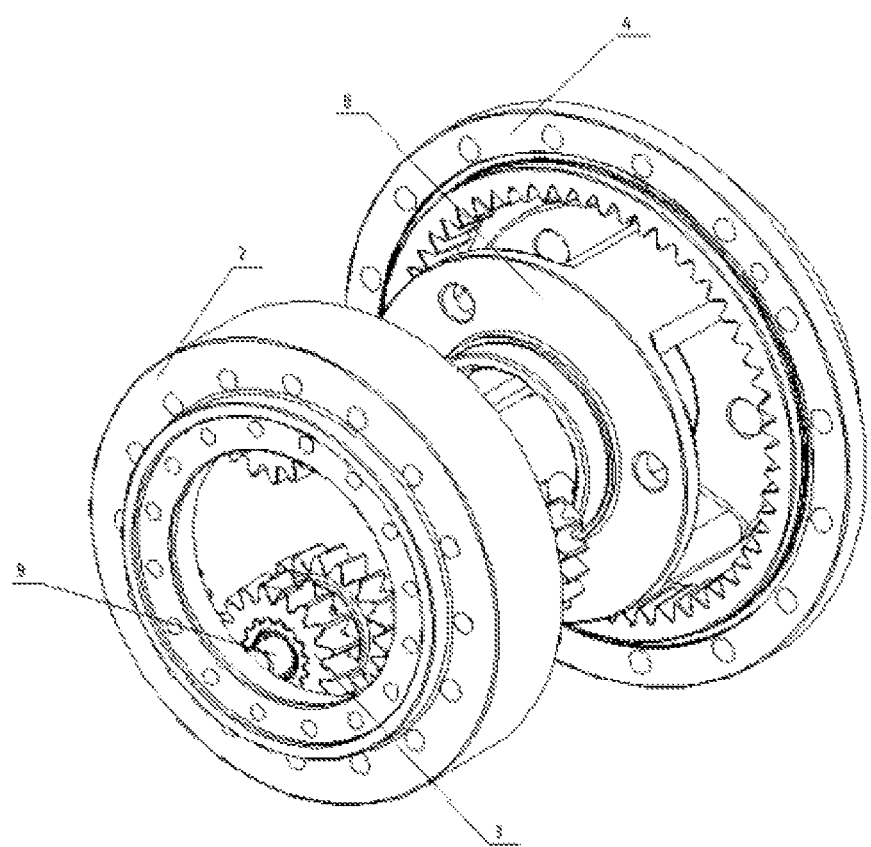
FIG. 2 is a schematic diagram of a planetary system assembly in the thickened robot joint transmission structure of the utility model.

Referring to FIGS. 1-2, the thickened robot joint transmission structure is arranged in a center array. The dual thickened planetary gears drive the dual thickened planetary gear rings.

Referring to FIG. 2, the dual thickened planetary gears 3, the planetary carrier 8, the planetary pin 9, the first thickened gear ring 2 and a second thickened gear ring 4 form a planetary system assembly. The dual thickened planetary gears are arranged in a central symmetrical manner, or are arranged in a non-central equiangular shape to satisfy the planetary transmission law.

Referring to FIGS. 1-2, the first thickened gear ring 2 is connected to the output shaft 7 to form an output structure, and is fixed to the shell through a high-strength crossed cylindrical roller bearing. The dual thickened planetary gears have a thickness continuously changing in a tooth direction and have continuously changed helix angles and pressure angles. The planetary pin in the planetary carrier and the transmission center can be in a parallel or angular relationship. The first thickened gear ring 2 and the planetary carrier 8 form a fixed combination structure and are relatively rotatable by the bearing 10 and the planetary carrier 8. The dual thickened planetary gears are of a sun-gear-free structure and serves as a hollow shaft for a cable, a related shaft or a line object to pass through after the sun gear is removed. The planetary carrier 8 is fixed to the shell through the crossed roller bearing 10. The crossed roller bearing is of a sealed structure. The left side and the right side of the crossed roller bearing may be separated by grease or fat.

The gear ratio of the first stage transmission chain is i1; the numbers of teeth of the first thickened gear ring and the second thickened gar ring are z2 and z4 respectively; the number of teeth of the dual thickened planetary gears is z1 and z3 respectively, and then the total gear ratio is i1*z1*z4/(z1*z4−z2*z3).

Embodiment 1

The driving mechanism 6 drives the first stage transmission chain 5. One gear in the transmission chain drives the planetary carrier 8 to rotate. The planetary carrier 8 drives the planetary pin 9 to rotate along the center, and meanwhile drives the dual thickened planetary gears 3 to rotate and revolve. The thickened gear ring 2 is fixed on the box shell assembly 1 and has a speed of 0 rpm.

Under the driving of the planetary gear, the first thickened gear ring has an output speed since the first thickened gear ring is connected to the output shaft 9 in an interference manner or through a pin or a bolt. The dual thickened planetary 2 and the first thickened gear ring ensure extremely small output gap and backhaul errors under the action of the dual thickened planetary gears 3. The gear ratio of the first stage transmission chain is i1; the numbers of teeth of the thickened gear rings are z2 and z4 respectively; the number of teeth of the dual thickened planetary gears is z1 and z3 respectively, and then the total gear ratio is i1*z1*z4/(z1*z4−z2*z3).

The tooth profile of the thickened gears must be continuously changeable in the thickness direction of the tooth direction, and each pair of meshed gears conforms to the principle of gear meshing involute.

A sun gear is generally adopted in the prior art for driving, while the planetary carrier is adopted in the utility model for driving; there must be two degrees of freedom for dual gear rings, so there are two output speeds, and therefore, if the speed of one gear ring is set to zero, the speed is output by the other gear ring.

What is claimed is:

1. A robot joint transmission structure, comprising a first stage transmission chain, a planetary carrier, a planetary pin, a planetary gear set that has two gears, a first gear ring, a second gear ring, a shell assembly and an output shaft, wherein the transmission structure is a sun-gear-free transmission structure; the first stage transmission chain serves as an input end; the first gear ring is connected to the output shaft and serves as an output end; a gear in the first stage transmission chain is meshed with the planetary carrier; the planetary pin is arranged on the planetary carrier; the planetary carrier and the planetary pin are connected with the planetary gear set; the planetary carrier drives the planetary pin to rotate around an axis, and simultaneously drives the planetary gear set to rotate and revolve; the two gears of planetary gear set are meshed with the first gear ring and the second gear ring respectively; the second gear ring is fixed on the shell assembly; the first gear ring is connected to the output shaft in an interference manner or through a fixing pin or a bolt; wherein the gear ratio of the first stage transmission chain is i1; the numbers of teeth of the first gear ring and the second gear ring are z2 and z4 respectively; the numbers of teeth of the two gears of the planetary gear set are z1 and z3, respectively, and then the total gear ratio is i1*z1*z4/(z1*z4−z2*z3).

2. The robot joint transmission structure according to claim 1, wherein the planetary gear set, the planetary carrier, the planetary pin, the first gear ring and the second gear ring form a planetary system assembly; the two gears of planetary gear set are arranged in a symmetrical manner, or are arranged in an equiangular shape.

3. The robot joint transmission structure according to claim 1, wherein the planetary pin in the planetary carrier and the axis are in a parallel.

4. The robot joint transmission structure according to claim 1, wherein the planetary carrier is rotatably mounted with the shell assembly by a crossed roller bearing.

5. The robot joint transmission structure according to claim 1, wherein the second gear ring is fixed to the shell assembly.

* * * * *